United States Patent [19]
Castoe

[11] 3,819,202
[45] June 25, 1974

[54] INDEPENDENT SUSPENSION SYSTEM FOR A MOTOR VEHICLE HAVING CAMBER AND CASTER ADJUSTMENTS

[76] Inventor: John Herman Castoe, 10234 McVine, Sunland, Calif. 91040

[22] Filed: Feb. 2, 1972

[21] Appl. No.: 222,860

[52] U.S. Cl. .............................. 280/96.2 B, 180/64
[51] Int. Cl. ............................................. B62d 17/00
[58] Field of Search ..... 280/96.2 R, 96.2 A, 96.2 B, 280/96.1; 180/64

[56] References Cited
UNITED STATES PATENTS

| | | | |
|---|---|---|---|
| 3,209,851 | 10/1965 | Collins | 280/96.2 |
| 2,624,592 | 1/1953 | MacPherson | 280/96.2 |
| 2,890,893 | 6/1959 | Laukhuff | 280/96.2 |

FOREIGN PATENTS OR APPLICATIONS

| | | | |
|---|---|---|---|
| 1,178,719 | 9/1964 | Germany | 280/96.2 |

*Primary Examiner*—Philip Goodman
*Assistant Examiner*—John A. Carroll
*Attorney, Agent, or Firm*—Robert L. Parker et al.

[57] ABSTRACT

The present invention relates generally to automotive suspensions systems adapted to support a steerable wheel hub assembly in a preset relation with respect to the frame of the vehicle. More particularly, there is disclosed apparatus which constitutes a modification of a factory preset suspension system of the general type which includes an independent coil spring mounted about elongated telescoping struts, compression and transverse links, all of which are mounted for limited rotational movement with respect to the frame and provide, in their known form fixed camber and caster setting of the wheel hub assembly with respect to the frame. The invention herein particularly describes means for providing adjustability in such a suspension arrangement to thereby permit compensation to be made as required from time to time due to such inevitable occurrences as changes in vehicle load, distribution of that load, front-end damage, metal fatigue, wheel offset, tire wear and configuration.

14 Claims, 7 Drawing Figures

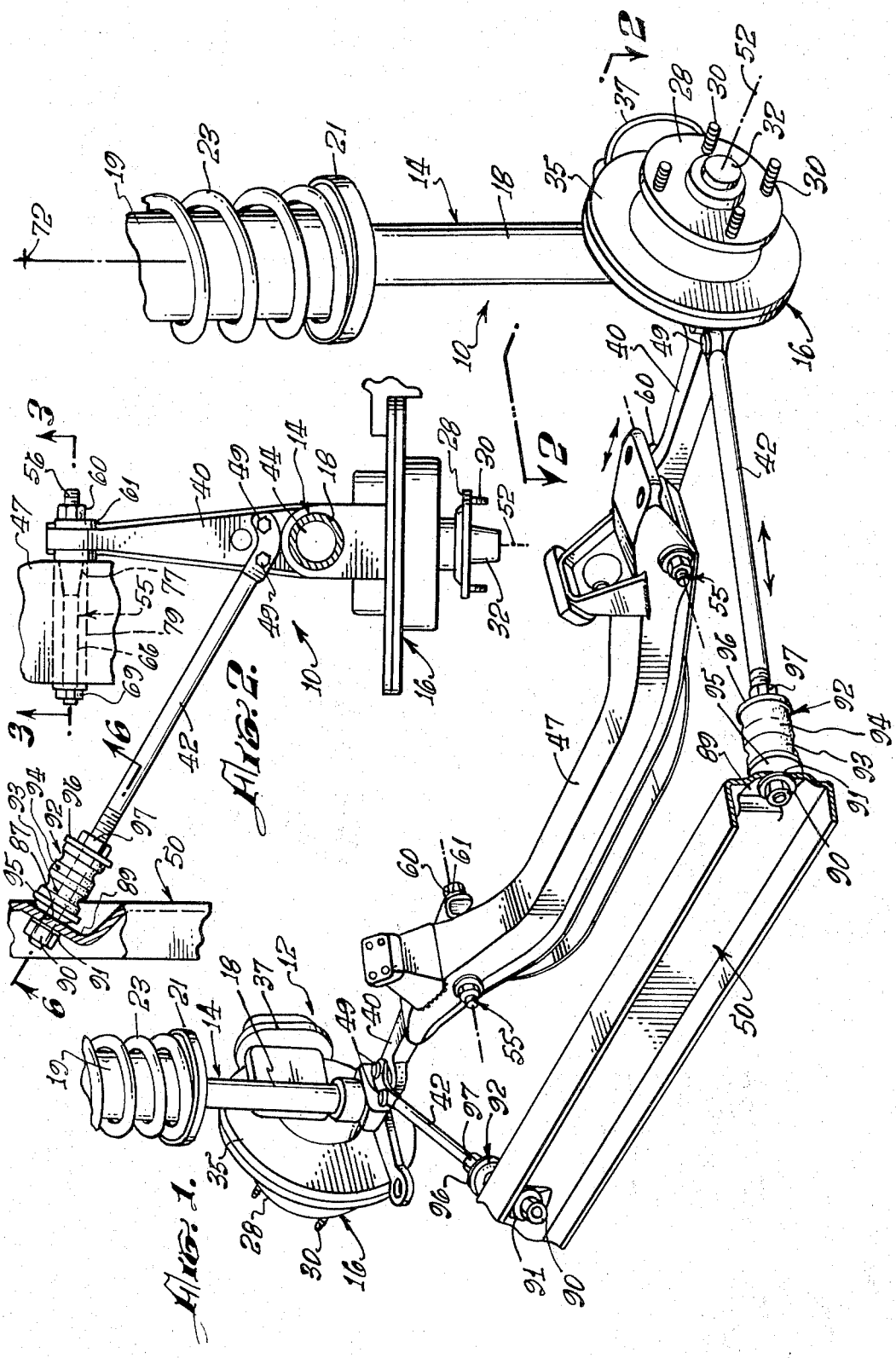

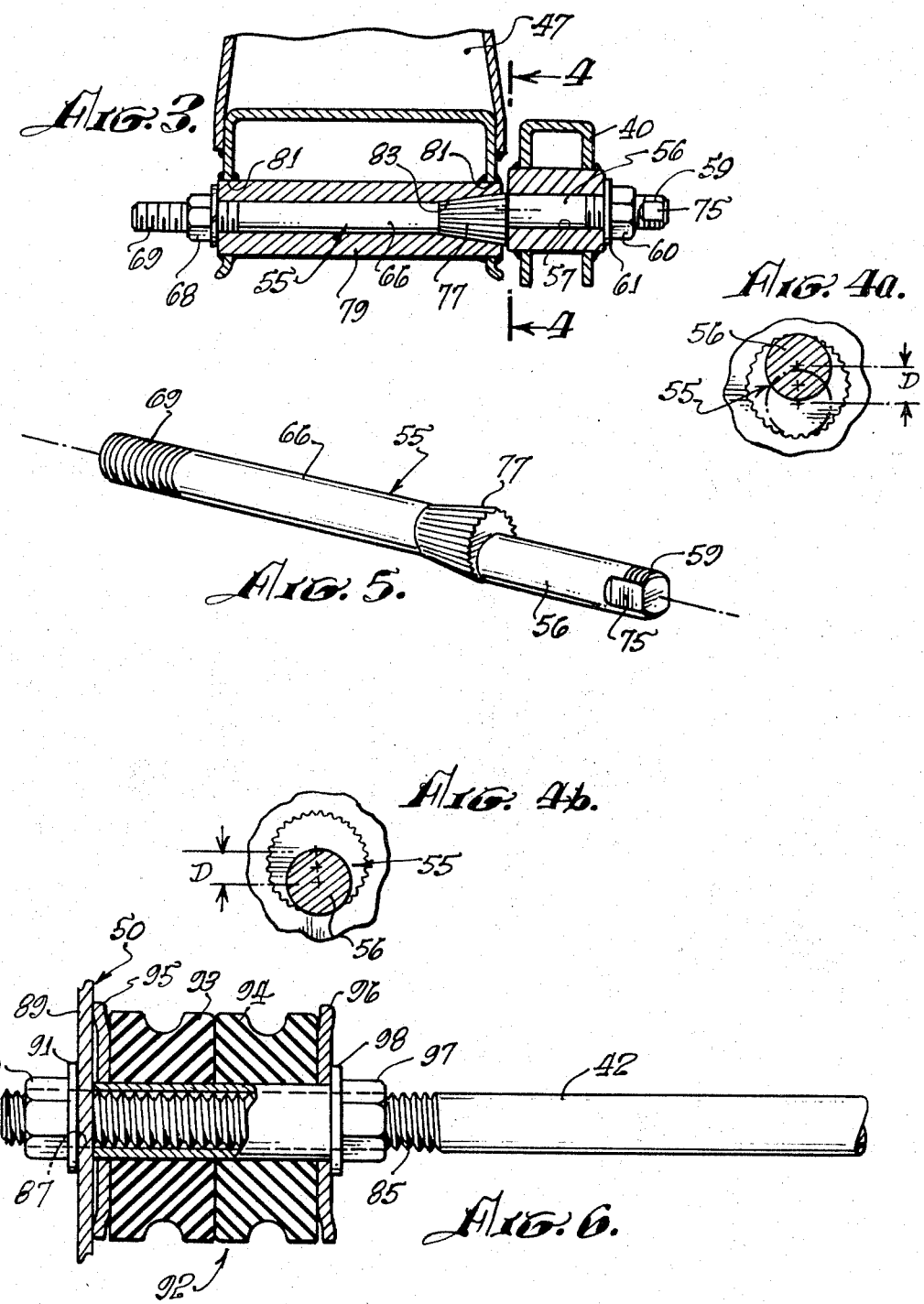

INDEPENDENT SUSPENSION SYSTEM FOR A MOTOR VEHICLE HAVING CAMBER AND CASTER ADJUSTMENTS

BACKGROUND OF THE INVENTION

The invention pertains specifically to improvements in front suspension systems for supporting wheel hub assemblies of motor vehicles in a predisposed position with respect to the vehicle frame and is directed specifically to the provision of means for permitting adjustment of camber and caster relations in suspension systems which are designed originally to be unadjustable, with camber and caster being fixed during the course of factory vehicle assembly.

Virtually from the time that automobiles appeared with steering wheels as contrasted to the joy sticks which were employed as the steering control element in very early models, the relationship, i.e., the position of the wheel with respect to the sprung weight or suspended portion of the vehicle (referred to here generally as the body or frame) has been recognized as an important factor in handling and control of the vehicle.

As automobiles have become more sophisticated, and have been designed to go faster, that relationship has taken on greater significance and, today, is the object of constant study, modification and improvement. The result which the car owner obtains is known to him as better handling and optimum tire wear. To the automotive engineer, these pedestrian terms are translated into the ability of the vehicle to "track," or otherwise stated, to hold a line; "surefootedness," or the ability of the car to retain a maximum area of contact with the road during cornering and without tire scuff, and "steerability," or the capability of the car to be maneuvered with optimum ease.

In order to accomplish these desirable ends, wheel hub assemblies which in conventional vehicles carry the wheel, tire and brake assembly are mounted in a set relationship to the frame and a spring or torsion bar system is disposed between the two in order that the wheel hub assembly may move, essentially in a vertical plane in response to deviations in road surface, with respect to the sprung weight of the vehicle, thereby smoothing out the ride.

Suspension systems of the type described are designed to respond to three essential parameters, all of which are somewhat interrelated, and all of which contribute to the handling characteristics of the vehicle. These parameters are commonly referred to as camber, caster and toe-in. The camber defines the deviation of the plane of the wheel toward or away from the longitudinal axis of the vehicle, passing through its mounting point from the vertical, and is referred to as either plus or minus depending upon the direction of the deviation. Caster is best understood by reference to caster wheels commonly employed on movable furniture, and may be described as the deviation of the wheel assembly forward, or to the rear of a vertical plane which is transverse to the plane in which the camber dimension is determined. Toe-in is the relationship of the wheel assembly to the theoretical vertical plane of the wheel and is either plus or minus depending upon whether the wheel turns inwardly toward the center of the vehicle or outwardly away from it.

All of these parameters are dimensional and cooperate to determine the steering and handling characteristics of the vehicle. In most vehicles today the permissible variation in these parameters is on the order of plus or minus one degree, but while seemingly insignificant, deviations from these tolerances cause significant deterioration in vehicle handling and tire wear.

Most vehicle manufacturers acknowledge, at least tacitly, the fallability of their engineering, design and manufacture, and provide means for adjusting these parameters on the vehicle after the same has left the factory assembly line. It is also recognized that factory tolerances are determined based upon an averaging of variables which inherently and inevitably affect the proper setting of these parameters. Among these factors are the load carried by the vehicle, which includes both the mass and its distribution within the passenger and luggage compartments. Naturally, any deviation from tolerances on suspension parts themselves will necessarily result in a deviation from the factory design average for the parameter specified. Moreover, deviation in the size and roundness of the wheel and tire mounted to the hub assembly, and its offset, may be expected to cause a deviation. And, naturally, any driving incident such as a collision with a pothole, rock, curb or another vehicle might be expected to alter factory settings, such as by bending, one or more of the suspension members which would change the suspension settings. Finally, metal fatigue might result in the consequent change in these settings. Thus, it is highly desirable to be able to set, and reset camber, caster and toe-in from time to time while the vehicle is in service.

Common among those systems where provisions are made for adjustability, are those which employ shims between a suspension member and the frame or body of the vehicle. Other systems use an eccentric within the hub which, in effect, varies the relationship of the wheel carrier, wheel and tire with respect to an axle and kingpin assembly. This arrangement constitutes an adjustment within the suspension itself, as contrasted to an adjustment of the entire suspension system with respect to the frame.

Notwithstanding the manifold factors which might adversely affect a factory-established setting for camber, caster or toe-in, some manufacturers, and particularly those who manufacture lighter vehicles, provide no camber or caster adjustment, and rely entirely upon close tolerances for mass-produced suspension parts (a paradox in itself) and the wishful hope that the suspension will not meet with adversity.

Among those systems which provide for no camber or caster adjustment, although a toe-in adjustment is provided, are the McPherson type systems now commonly in use in vehicles manufactured by Nissan Motors. In the McPherson type system a vertical strut, usually comprising a telescoping shock absorber accounts for the major portion of the vertical loading on the wheel hub assembly. The assembly is supported laterally by transverse and compression links, both of which are swing-mounted with respect to the frame, but have a fixed length which results in a factory pre-establishment of the camber and caster relation of the wheel hub assembly to the vehicle frame. The present invention is directed to improvements in this type of system.

SUMMARY OF INVENTION

The inventions as described and disclosed herein may be summarized as comprising apparatus for providing means for camber and caster adjustment during the period the vehicle is in service, for an otherwise fixed factory-adjusted suspension system. In particular, means are provided in accordance with the invention for altering the effective or operative length of lateral supporting links which cooperate to position the wheel hub assembly in a settable attitude with respect to the frame and body portion of the vehicle.

It is, therefore, an object of the invention to provide an improved suspension system for a motor vehicle having a factory set, non-adjustable suspension system whereby adjustability is provided without material alteration or modification of the suspension geometry or configuration.

It is another object of the invention to provide improvements in a suspension system of the type described wherein the system may be modified at the factory prior to assembly or at any time after leaving the factory without substantial or expensive modification and addition of parts, and without affecting the suspension configuration.

These and other objects and advantages of the present invention will become apparent from the following detailed description of a preferred embodiment, taken in conjunction with the appended drawings wherein:

FIG. 1 is a pictorial representation of an exemplary suspension system of the type described, embodying the present invention;

FIG. 2 is a plan view of a portion of FIG. 1 taken along lines 2 — 2 of FIG. 1;

FIG. 3 is a section of a portion of FIG. 2 taken along lines 3 — 3 and enlarged to better illustrate details of the preferred form of the camber adjustment means;

FIGS. 4 a and b are sectional views of FIG. 3 taken along lines 4 — 4 and enlarged to better illustrate the adjustment features, and range thereof, relating to camber as provided by the present invention;

FIG. 5 is a pictorial representation of an exemplary offset stud of the type employed in the preferred form of the present invention and specifically illustrated in FIG. 3; and FIG. 6 is a partial section of the compression link and caster adjustment means of FIG. 2, enlarged to illustrate a preferred form of the invention depicted in FIG. 2.

DESCRIPTION OF THE PREFERRED EMBODIMENT ILLUSTRATED

As will be evident from the following detailed description, the invention is susceptible of various modifications and alternative constructions, but for purposes of this disclosure, a particular illustrative embodiment is set out in the drawings and will be described in detail hereinafter. It will be understood that the invention is not intended to be strictly limited to the particular disclosed form, but rather to cover all modifications, alternative constructions, and equivalents falling within the sphere and scope of the invention.

With reference now to the drawings, and initially to FIG. 1 thereof, a suspension system of the type to which the present invention has particular utility, is pictorially represented. The system illustrated is of the McPherson type, and is of a particular type used by Nissan Motors in its Datsun Model 510 sedan. While both a left and right side are illustrated, the following description will be with respect to one side only, it being understood that the two sides are but mirror images of one another.

Referring, thus, to FIG. 1, there is illustrated a suspension system comprising a left side 10 and a right side 12, each of which include a strut assembly 14 and the hub assembly indicated generally at 16. The strut assembly constitutes the vertical load member for the suspension system and, in the case illustrated, comprises an essentially vertically disposed strut 18 with a telescoping member 19 overlapping the same. A lower spring seat 21 secured to the member 19, supports a heavy coil spring 23 about the member 19, the upper portion of which is adapted to engage the frame of the vehicle to thereby flexibly support the same. The members 18 and 19 respectively combine to comprise a telescoping shock member typically having a fluid cushion between the two and the spring and shock together cushion and dampen the vertical load represented by the body and frame of the vehicle, and the shock loading due to road deviation with respect to the hub assembly 16.

The hub assembly includes, for purposes of this description, a hub 28 which carries wheel studs 30 and is mounted on a stub axle 32. The hub assembly also includes, in the illustrated case, a disc brake assembly including a rotor 35 having a portion thereof sandwiched in a caliper assembly 37. While the vertical loading and support is provided and carried by the strut assembly 14, the hub assembly is also supported laterally by a transverse link 40 and a compression link 42.

As may be best seen in FIG. 2, the hub assembly is mounted for steering about vertical kingpin 44, which is part of the strut assembly 14. The transverse link 40 is fixed directly to the hub assembly, extending essentially laterally inwardly therefrom to a suspension cross member 47 which comprises a portion of the frame fixed to or integral with the body of the vehicle. In the illustrated case, the transverse link is essentially parallel to and coplanar with, the axle 32. As will be seen in FIG. 1, with reference to the left side in particular, the transverse link is also disposed below the axis of the axle.

The compression link 42, as illustrated, extends laterally inwardly and forwardly from the hub assembly 16. It will be understood that this particular link may also extend rearwardly depending upon the particular configuration of the suspension system to which the invention is applied. As best seen in FIG. 2, the compression link is fastened to the transverse link by bolts 49 and extends to and intersects a frame cross member 50 which, in this instance, is disposed forwardly of the suspension cross member 47. As in the case of the transverse link, the compression link is secured beneath the axis of the hub assembly, and cooperates with the transverse link to provide lateral positioning and support for the hub assembly with respect to the frame and body of the vehicle.

As described, it is apparent that the attitude of the hub assembly is determined by the relative positions of the strut assembly 14 and the transverse and compression links 40 and 42, respectively. Since the hub assembly is steerable about the post 18 which may be integral with, but at the very least is fixed with respect to, the kingpin 44, the length of the transverse and compression links, respectively, will determine the stance of the wheel of the vehicle within references determined by the longitudinal axis of the pin 44 and the axis of the axle represented by broken line 52 of FIG. 1. It will be evident, in light of the foregoing, that the effective length of the transverse link 40 will determine the camber setting of the wheel hub assembly and, likewise, the effective length of the compression link will determine the caster setting of the wheel hub assembly.

In keeping with the invention, means is provided for varying the effective length of the transverse compression links, respectively, to thereby permit limited adjustment of camber and caster of the hub assembly without alteration of any suspension member. With reference particularly to FIG. 2, it will be seen that the transverse link 40 is secured to the cross member 47 by means of stud 55, a portion of which 56 protrudes from the suspension member 47 and passes through an aperture 57 (see FIG. 3) in the link 40. In the illustrated case, the end of the stud is threaded as at 59 and a locking nut 60 backed by a washer 61 secures the stud with respect to the transverse link 40. Because it is necessary to permit limited rotation of the transverse link about the stud 55 as the wheel encounters changes in road surface, a bushing 62 is secured about the protruding portion 56 of the stud to reduce friction and permit relative rotation in a plane transverse to the axis of the protruding portion 56.

As may be seen particularly in FIGS. 4a and 4b, the protruding portion 56 of the stud 55 is offset by an amount D with respect to the axis of mounting thereof in the cross member 47. While in the embodiment described and depicted, the mounting member comprises a stud 55, it will be appreciated that the offset with respect to the axis of rotation is the significant feature and other mounting devices accomplishing essentially the same end may be employed without departure from the invention. Referring again to FIGS. 3 and 5, the exemplary stud has a main body portion 66 which, as may be seen in FIG. 3, extends through the cross member 47, the end opposite portion 56 extending beyond the cross member, and being secured relative to the cross member by means of nut 68 disposed on the threaded end 69 thereof.

Further in keeping with the invention, the effective length of the transverse link may be adjusted by positioning the offset portion relative to the axis of rotation thereof, which comprises the mounting axis of the transverse link, to be disposed either forward of, or to the rear of, the axis of the main portion 66 of the stud as seen in FIG. 3. Such positioning will vary the axis of mounting of the transverse link either inwardly towards the center of the vehicle or outwardly away from the center of the vehicle by a predetermined amount which has a range of 2D as established by the amount of offset D built into the stud 55. Such movement will cause rotation of the hub assembly about a theoretical vertical mounting point 72 for the strut assembly 14 and thus permit a variation in the camber of the hub assembly relative to the frame of the vehicle.

Further in keeping with other objectives of the invention, adjustment is readily made, and once selected, firmly held, and this is accomplished as best illustrated in FIGS. 3 and 5 respectively by means of flats 75 formed on the protruding end of the portion 56 of the stud 55. Quite clearly, by applying a crescent wrench or the like to the flat 75, the portion 56 may be rotated relative to the cross member 47 to establish both the direction and amount of offset to be applied to the suspension system.

In order to insure integrity of the system once it is made, the stud 55 is formed with an intermediate taper portion 77 which, as illustrated is disposed between the portion 56 and 66 of the stud. An elongated bushing 79 mounts in apertures 81 in the legs of the cross member 47 for receipt of the portion 66 and 77 of the stud 55, and at one end thereof is formed with an internal taper 83 which complements the taper 77. Thus, to adjust and secure the camber setting for the suspension system, the nuts 60 and 68 respectively are loosened and the position of the offset portion 56 established by applying a wrench to the flat 75 and setting the same. The nut 68 is then tightened, thus drawing the taper 77 into snug friction contact with the taper surface 83 of the bushing. With the two surfaces in mating contact, the frictional forces between the surfaces are substantial, thereby inhibiting and preventing rotation of the stud. The nut 60 is then tightened, but the bushing 62 permits relative rotation of the transverse link in an essentially vertical plane about the axis of the offset portion 56. The camber adjustment is thus established and fixed.

As previously stated, proper setting of any suspension system requires adjustment capability for both the camber and caster parameters. In keeping, therefore, with another aspect of the invention, caster adjustment is provided by adjustment of the effective length of the compression link 42. As may be seen from the previous description, the distance between the frame cross member 50 and the hub assembly 16 is determinative of the caster of the wheel with respect to the frame of the vehicle. This distance is determined by the compression length which, in known suspension systems of the type herein described, is fixed, thereby preventing caster adjustment without replacement of the link itself.

In order, therefore, to provide caster adjustment for the described suspension system, means is provided for varying the effective length of the compression link to thereby permit adjustment of the caster. Reference will be had to FIGS. 1, 2 and 6 in particular wherein a preferred embodiment of this aspect of the invention is detailed.

Specifically, as seen in FIG. 6, the forward end of the compression link 42 is formed with an elongated threaded portion 85 which is of sufficient length to pass through and beyond an aperture 87 disposed in a receiving wall 89 of the frame cross member 50. As will be seen in FIG. 2, the wall 89 is offset and angled so as to be essentially transverse to the longitudinal axis of the link 42 thereby facilitating fastening of the link to the frame member. The link 42 is attached to the frame member by sandwiching the wall portion 89 between a nut 90 backed by a washer 91 which bears directly against the forward surface of the wall 89, and an adjustable compression assembly indicated generally at 92 of FIG. 6. The compression assembly is provided to accept and disperse shock loading experienced by the wheel relative to the frame. To this end, compression bushings 93 and 94 are disposed between washers 95 and 96, respectively, to form the assembly. The washer 95, as may be seen in FIG. 6, rests directly against the wall 89, and the washer 96 is supported by adjustment positioning nut 97 and washer 98.

Caster adjustment is effected by loosening nut 90 and 97 respectively. The length of the threaded portion 85 is such that limited advancement of retraction of the link relative to the frame cross member may be effected, thereby establishing the effective length of the link and consequently, the caster of the hub assembly. Once the proper caster is established through the use of gages and known techniques available, the nuts are tightened and adjustment has been easily and economically effected. Moreover, no substantial modification of the suspension system has been required and such modifications as are required, are inexpensive and readily assembled either as original factory equipment or as replacement parts.

Having thus described the preferred embodiment of my invention, what is claimed is:

1. An improved forward independent suspension system for supporting wheel hub assemblies in adjustable relation with respect to the frame of an automobile, the suspension system including a forward frame cross-member, a suspension cross-member rearward of the frame cross-member and essentially parallel thereto, independent left and right side assemblies each adapted to support a wheel hub assembly in a presettable position with respect to the frame and being adjustably mounted to the frame and suspension cross-members respectively, each said side assembly including a wheel hub assembly steerably mounted for limited rotation about an essentially vertically extending elongated strut, each wheel hub assembly also including an axle defining a transverse axis of rotation of a respective wheel hub, a transverse link fixed to said hub assembly at a point below the axis of rotation of the wheel hub and extending inwardly therefrom and connected to said suspension cross-member at a point below the axis of rotation of the wheel hub, the transverse link including connecting means joining it with said suspension cross-member, the connecting means being disposed transverse to the axis of the transverse link and being rotatable to adjust the effective length of the transverse link to thereby provide a predetermined camber to the wheel hub assembly, and a compression link rigidly secured to the hub assembly at a point below the axis of rotation of the wheel hub and extending outwardly therefrom and connected with said frame cross-member at a point below the axis of rotation of the wheel hub, the compression link including means interconnecting it with the frame cross-member, said interconnecting means being settable to adjust the effective length of the compression link to thereby provide a predetermined caster to the wheel hub assembly.

2. The apparatus as described in claim 1 wherein said connecting means is rotatably mounted in said suspension cross member and aligned to have its axis of rotation essentially perpendicular to and coplanar with said transverse link, a portion of said connecting means protruding from said suspension cross member and being offset with respect to the axis of rotation thereof, said transverse link being mounted to said offset portion whereby rotation of said connecting means varies the effective length of said transverse link to thereby establish the camber of the wheel hub.

3. The apparatus as described in claim 2 wherein said connecting means comprises a stud having a first portion thereof passing through and rotatably secured in said suspension cross member, and a second portion thereof being offset with respect to the axis of rotation of said first portion, and extending outwardly beyond said suspension cross member, said transverse link being rotatably received on said second portion with the end of the second portion protruding longitudinally beyond said transverse link, means disposed at the end of said second portion for rotating said stud to adjust the camber of said wheel hub assembly, and locking means to secure said stud in a preset position.

4. The apparatus as described in claim 1 wherein said frame cross member is formed with an aperture adapted to receive a portion of the compression link, said compression link having an end portion passing through the aperture in said frame cross member, selective locking means disposed on said end portion disposed on either side of and sandwiching said frame cross member therebetween, said locking means being positioned on said end portion to secure said compression link to said frame cross member to establish a predetermined distance between said frame cross member and said wheel hub assembly to thereby adjust the caster of said wheel hub assembly.

5. The apparatus as described in claim 1 wherein said frame cross member is formed with an aperture adapted to receive a portion of the compression link, said compression link having a threaded portion at the end thereof remote from the wheel hub assembly and passing through the aperture within said frame cross member, and lock nuts disposed on said threaded end portion disposed to sandwich said frame cross member therebetween, said lock nuts being movable so that said connecting link may be secured to said frame cross member to establish a predetermined distance between said frame cross member and said wheel hub assembly to thereby adjust the caster of said wheel hub assembly.

6. The apparatus as described in claim 2 wherein said connecting means comprises a stud having a first portion thereof passing through and rotatably secured in said suspension cross member, and a second portion thereof being offset with respect to the axis of rotation of said first portion and extending outwardly beyond said suspension cross member, said transverse link being rotatably received on said second portion with the end of the second portion protruding longitudinally beyond said transverse link, means disposed at the end of said second portion for rotating said stud to adjust the camber of said wheel hub assembly, and means for selectively frictionally engaging said stud and suspension cross member to thereby secure said stud in a preset position with respect thereto.

7. The apparatus as described in claim 6 wherein a bushing member is disposed in said suspension cross member to receive the first portion of said stud for rotation therein, said stud being formed with a taper portion adapted to selectively engage a complementary portion of said bushing to thereby lock said stud against rotation relative to said suspension cross member with said second portion of said stud disposed in a preset position.

8. The apparatus as described in claim 6 wherein said connecting means comprises a stud having a first portion thereof passing through and rotatably secured in said suspension cross member, and a second portion thereof being offset with respect to the axis of rotation of said first portion, and extending outwardly beyond said suspension cross member, said transverse link being rotatably received on said second portion with the end of the second portion protruding longitudinally beyond said transverse link, means comprising flats disposed at the end of said second portion to permit gripping the same for rotating said stud to adjust the camber of said wheel hub assembly, and means for selectively frictionally engaging said stud and suspension cross member to thereby secure said stud in a preset position with respect thereto.

9. An improved forward independent suspension system for supporting wheel hub assemblies in adjustable relation with respect to the frame of an automobile having a forward frame cross-member, and a suspension cross-member rearward thereof and essentially parallel thereto, said suspension system consisting of independent left and right side assemblies each adapted to support a wheel hub assembly in a presettable position with respect to the frame and being adjustably mounted to said frame and suspension cross-members respectively, each said side comprising a wheel hub assembly steerably mounted for a limited rotation about an essentially vertically extending elongated strut, a transverse link fixed to said hub assembly and extending inwardly therefrom to said suspension cross-member, and a compression link rigidly secured to said hub assembly and extending outwardly therefrom and connected with said frame cross-member, connecting means joining said transverse link in said suspension cross-member, said connecting means being disposed transverse to the axis of said transverse link and being rotatable to adjust the effective length of said transverse link to thereby provide a predetermined camber to said wheel hub assembly, the connecting means being rotatably mounted in said suspension cross-member and aligned to have its axis of rotation essentially perpendicular to and coplanar with said transverse link, a portion of said connecting means protruding said suspension cross-member and being offset with respect to the axis of rotation thereof, said transverse link also being mounted to said offset portion such that rotation of said connecting means varies the effective length of said transverse link to thereby establish the camber of the wheel hub, and means interconnecting said frame cross-member and said compression link, said means being settable to adjust the effective length of said compression link to thereby provide a predetermined caster to said wheel hub assembly.

10. Apparatus according to claim 9 in which said connecting means comprises a stud having a first portion thereof passing through and rotatably secured in said suspension cross-member, and a second portion thereof being offset with respect to the axis of rotation of said first portion, and extending outwardly beyond said suspension cross-member, said transverse link being rotatably received on said second portion with the end of the second portion protruding longitudinally beyond said transverse link, means disposed at the end of said second portion for rotating said stud to adjust the camber of said wheel hub assembly, and locking means to secure said stud in a preset position.

11. Apparatus according to claim 9 in which said connecting means comprises a stud having a first portion thereof passing through and rotatably secured in said suspension cross-member, and a second portion thereof being offset with respect to the axis of rotation of said first portion and extending outwardly beyond said suspension cross-member, said transverse link being rotatably received on said second portion with the end of the second portion protruding longitudinally beyond said transverse link, means disposed at the end of said second portion for rotating said stud to adjust the camber of said wheel hub assembly, and means for selectively frictionally engaging said stud and suspension cross-member to thereby secure said stud in a preset position with respect thereto.

12. Apparatus according to claim 11 in which a bushing member is disposed in said suspension cross-member to receive the first portion of said stud for rotation therein, said stud being formed with a tapered portion adapted to selectively engage a complementary portion of said bushing to thereby lock said stud against rotation relative to said suspension cross-member with said second portion of said stud disposed in a preset position.

13. Apparatus according to claim 11 in which said connecting means comprises a stud having a first portion thereof passing through and rotatably secured in said suspension cross-member, and a second portion thereof being offset with respect to the axis of rotation of said first portion, and extending outwardly beyond said suspension cross-member, said transverse link being rotatably received on said second portion with the end thereof protruding longitudinally beyond said transverse link, means comprising flats disposed at the end of said second portion to permit gripping the same for rotating said stud to adjust the camber of said wheel hub assembly, and means for selectively frictionally engaging said stud and suspension cross-member to thereby secure said stud in a preset position with respect thereto.

14. An improved forward independent suspension system for supporting wheel hub assemblies in adjustable relation with respect to the frame of an automobile having a forward frame cross-member, and a suspension cross-member rearward thereof and essentially parallel thereto, said suspension system consisting of independent left and right side assemblies each adapted to support a wheel hub assembly in a presettable position with respect to the frame and being adjustably mounted to said frame and suspension cross-members, respectively, each said side comprising a wheel hub assembly steerably mounted for limited rotation about an essentially vertically extending elongated strut, a transverse link fixed to said hub assembly and extending inwardly therefrom to said suspension cross-member, and a compression link rigidly secured to said hub assembly and extending outwardly therefrom and connected with said frame cross-member, the frame cross-member being formed with an aperture adapted to receive a portion of the compression link, the compression link having a threaded portion at the end thereof remote from the wheel hub assembly and passing through the aperture within the frame cross-member, and lock nuts disposed on said threaded end portion disposed to sandwich said frame cross-member therebetween, said lock nuts being movable so that said connecting link may be secured to said frame cross-member to establish a predetermined distance between said frame cross-member and said wheel hub assembly to thereby adjust the caster of said wheel hub assembly, connecting means joining said transverse link in said suspension cross-member, said connecting means being disposed transverse to the axis of said transverse link and being rotatable to adjust the effective length of said transverse link to thereby provide a predetermined camber to said wheel hub assembly, the connecting means further including a stud having a first portion thereof passing through and rotatably secured in said suspension cross-member, and a second portion thereof being offset with respect to the axis of rotation of said first portion, and extending outwardly beyond said suspension cross-member, said transverse link being rotatably received on said second portion with the end thereof protruding longitudinally beyond said transverse link, means comprising flats disposed at the end of said second portion to permit gripping the same for rotating said stud to adjust the camber of said wheel hub assembly, and means for selectively frictionally engaging said stud and suspension cross-member to thereby secure said stud in a preset position with respect thereto, and means interconnecting said frame cross-member and said compression link, said means being settable to adjust the effective length of said compression link to thereby provide a predetermined caster to said wheel hub assembly.

* * * * *